July 3, 1923.   1,460,492
H. L. LATZ
COMMUNICATION SHEET
Filed March 31, 1920
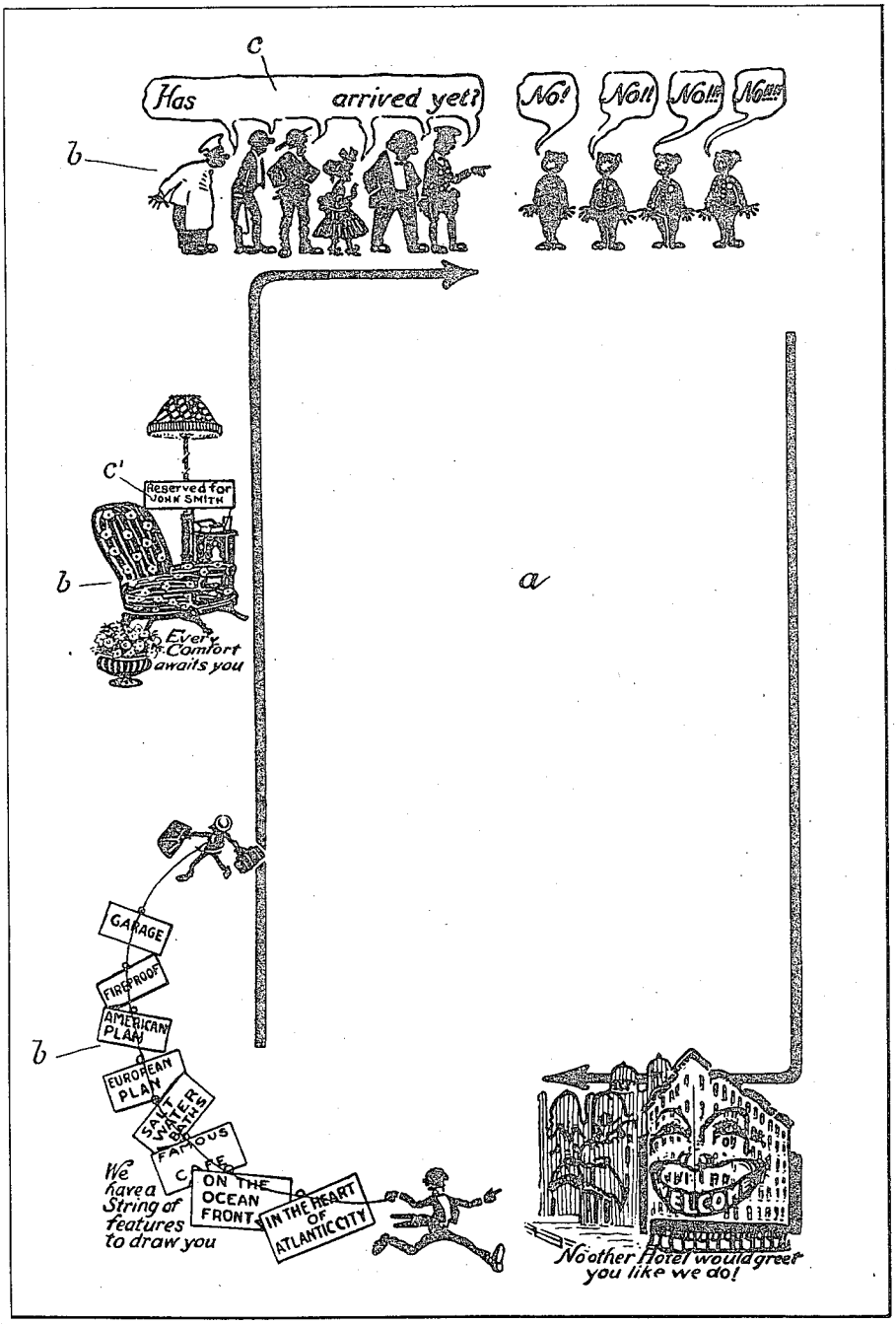
WITNESSES
INVENTOR
HARRY L. LATZ
BY
ATTORNEYS Patented July 3, 1923.

1,460,492

UNITED STATES PATENT OFFICE.

HARRY L. LATZ, OF ATLANTIC CITY, NEW JERSEY.

COMMUNICATION SHEET.

Application filed March 31, 1920. Serial No. 370,140.

*To all whom it may concern:*

Be it known that I, HARRY L. LATZ, a citizen of the United States, and a resident of Atlantic City, Atlantic County, State of New Jersey, have invented certain new and useful Communication Sheets, of which the following is a specification.

The invention relates to communication sheets and particularly to sheets of letter paper and the particular object of the invention is to produce such a sheet which will have an intense effect upon the recipient.

A specimen of a sheet of letter paper prepared in accordance with my invention is shown in the drawing. In the drawing the space marked $a$ constitutes a main blank space adapted for the manuscript insertion of some specific communication or letter. The sheet is provided with a border $b$. Within this border are printed pictorial designs of pronounced and striking character. While the particular design chosen may be of any suitable variety, it is important that the effect thereof shall have distinctly that of printed matter. Within this border $b$ and constituting a part of the pictorial design, are subsidiary blank spaces $c$ which are adapted to be filled in by hand (as indicated in the space $c'$ of the drawing) with the name of the recipient of the communication. These subsidiary blanks $c$ are associated with the pictorial design of the border $b$ in such a manner that when filled in a natural completion of the printed design is effected (as clearly seen at $c'$). The border $b$ is preferably printed with black ink so that the color of the black writing ink (India ink is recommended) used in filling in the name of the recipient shall harmonize with the border. The border, including the name when filled in by hand, conveys the distinct impression of having been printed and created especially for the particular person named therein. This makes the communication a very personal one and has a tendency to greatly please the vanity of the recipient. Announcements or advertisements when filled in the blank space $a$ will almost certainly receive attention if printed upon a sheet of this character with the name of the addressee properly filled in the blank space $c$. The communication sheet itself thus becomes capable of compelling attention, and attention of a sympathetic kind, to the contents of whatever communication may be contained in the blank space $a$, whether the same is in the form of a circular, a mimeographed reproduction or a personal note.

What I claim is:

1. A communication sheet provided with a blank space adapted to receive a communication inscription, a border for said space initially produced upon said sheet and defining a major portion thereof, said border including a plurality of pictorial representations, at least one of which has associated therewith a blank form intended to be subsequently filled in, by the writer of the communication, with an inscription to complete the design of the representation and its associated form, said representation and the words of said form being of such a character as, together with the inserted inscription, to have a definite meaning with respect to the addressee, and the matter initially produced upon said sheet being of a general appearance such as to facilitate the filling in of said blank form with said subsequent inscription in a manner to bear a close similarity in appearance to said initial inscriptions, whereby the completed whole has the appearance of having been initially produced upon said sheet.

2. A letter sheet provided with a blank space adapted to receive a written communication, a border surrounding said space, said border including a plurality of inscriptions initially inserted thereon, at least one of which inscriptions is provided with a blank space intended to be filled in with the name of the addressee by the writer of the communication, said inscription and the name to be inserted in the blank conveying a definite meaning with respect to the addressee.

In testimony whereof I have hereunto set my hand.

HARRY L. LATZ.